May 16, 1967  D. P. WELLES, JR., ET AL  3,320,160
METHOD AND APPARATUS FOR AERATING
A BODY OF LIQUID

Filed Aug. 24, 1965  4 Sheets-Sheet 1

INVENTORS.
DONALD P. WELLES, JR.
RONALD J. WEIS
BY Parker & Carter
Attorneys.

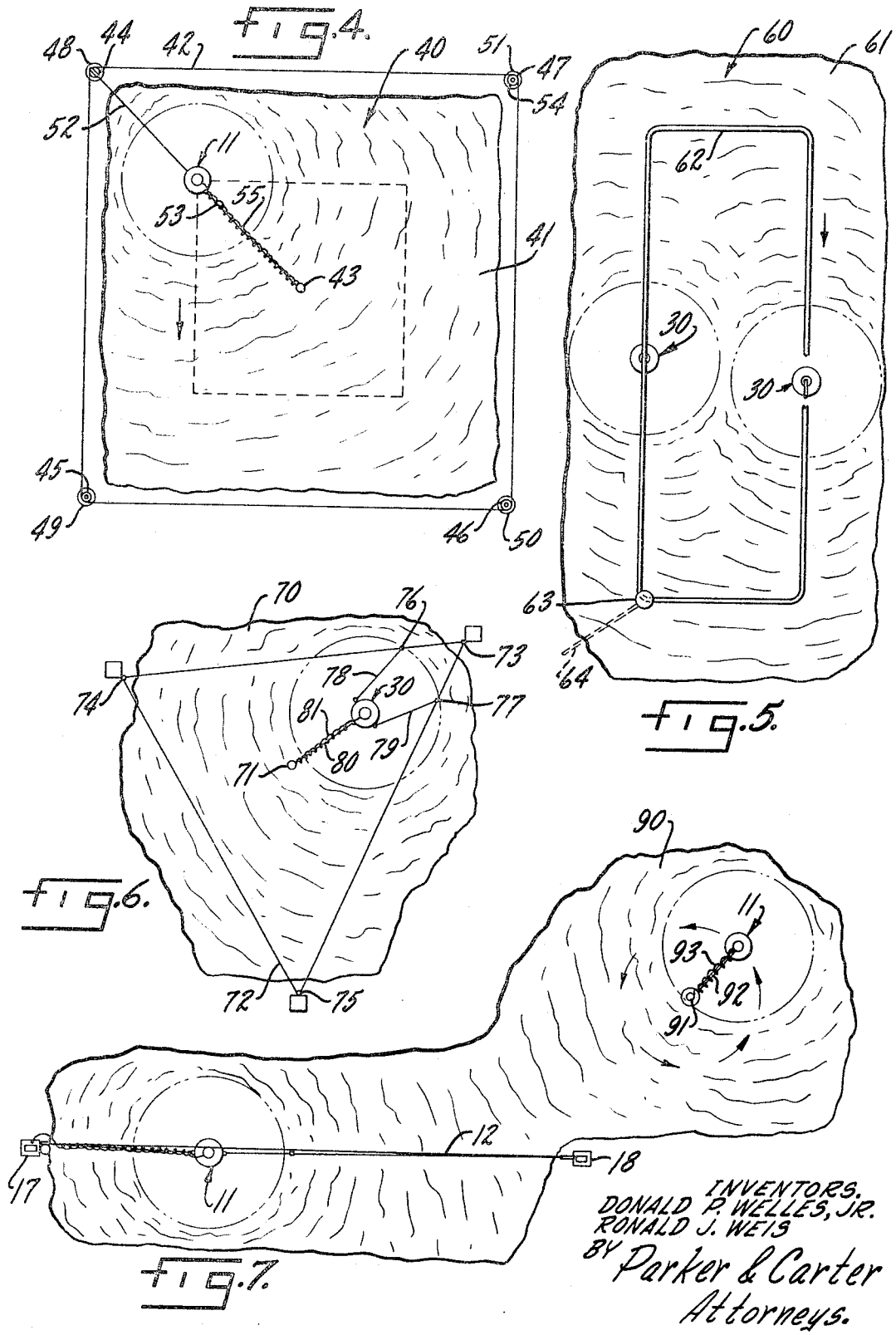

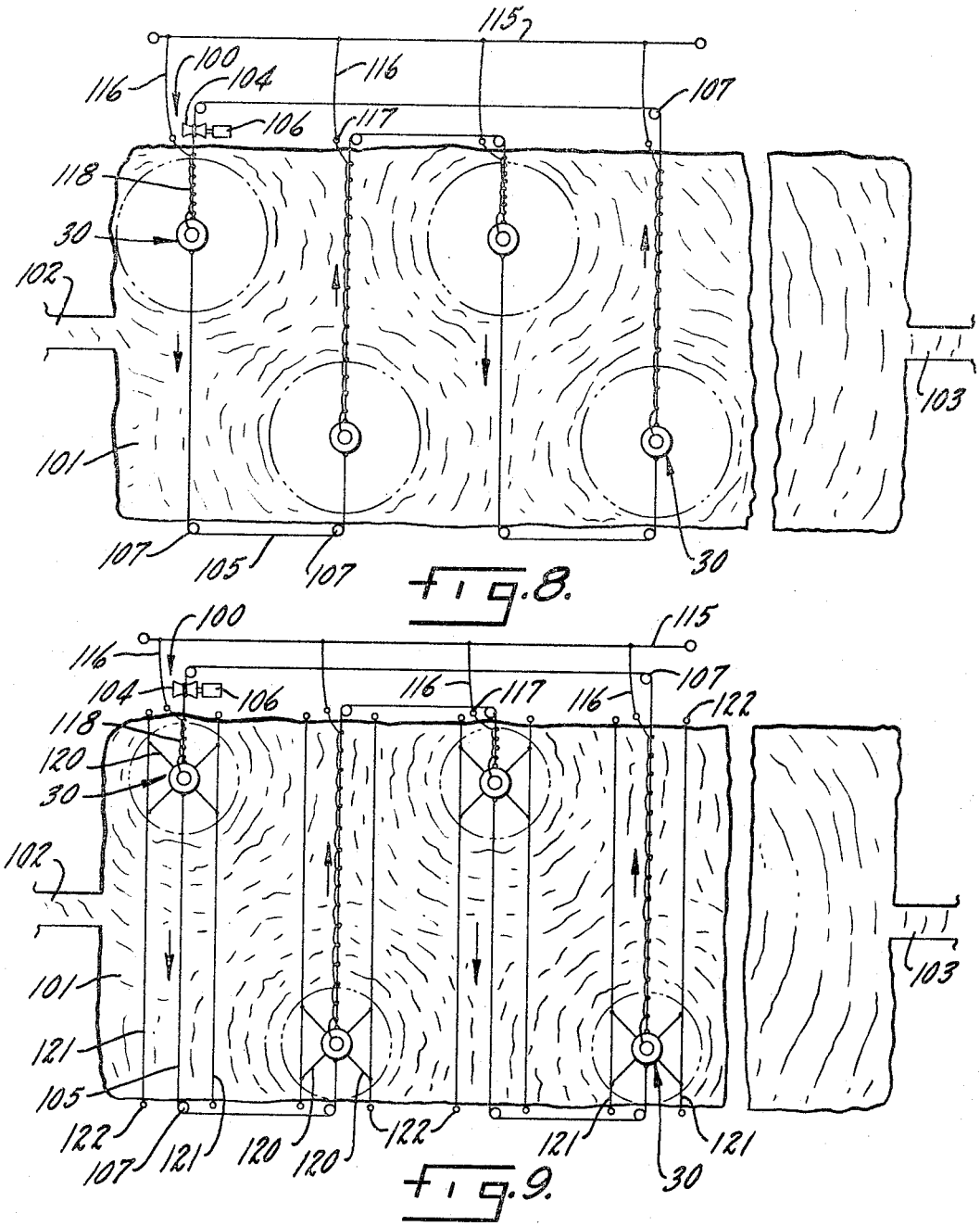

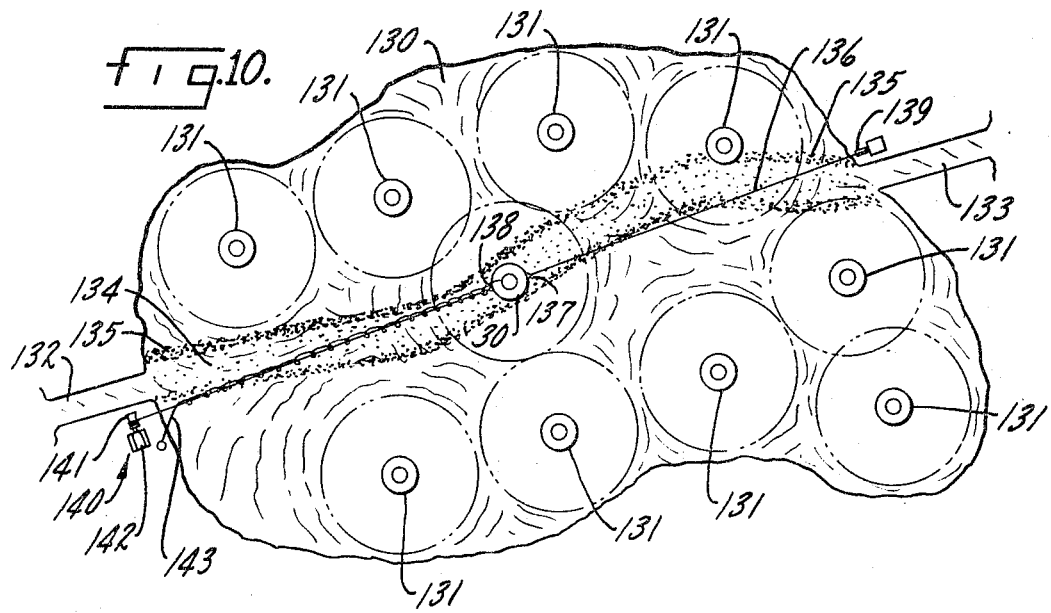

United States Patent Office 3,320,160
Patented May 16, 1967

3,320,160
METHOD AND APPARATUS FOR AERATING A BODY OF LIQUID
Donald P. Welles, Jr., Rockford, Ill., and Ronald J. Weis, Beloit, Wis., assignors to Welles Products, Inc., Roscoe, Ill., a corporation of Illinois
Filed Aug. 24, 1965, Ser. No. 482,202
7 Claims. (Cl. 210—14)

This invention relates to a method of and apparatus for mixing, influencing and aerating large bodies of liquid utilizing a relatively small number of floating aeration units.

One object is a method of mixing, influencing and aerating a large body of liquid by moving one or more floating power-driven aeration units across the surface of the body of liquid.

Another object is a method of providing an adequate distribution of oxygen in all parts of a relatively large body of liquid by successively operating one or more floating, power-driven aeration units in various locations on the surface of the body of liquid.

Another object is a method of aerating a large body of water by continuously moving a plurality of separate floating power-driven aeration units in complementary paths across the surface of the water.

Another object is a method of supplying oxygen to a large body of water by operating a power-driven floating aeration unit in one location in the body of water for a predetermined period of time, moving the aeration unit to another position in said body and operating said unit there for a predetermined period of time and continuing said movements and operations until all of the body of water has been adequately aerated.

Another object is an apparatus for moving a floating aeration unit reciprocally across the surface of a body of water.

Another object is an apparatus for moving a floating aeration unit about a closed path across the surface of a body of water.

Another object is to substantially increase the sphere of influence of a given aerator or aerators through the movement thereof.

Another object is to offset any hydraulic blocks that might result in relatively slow movement of the liquid at the periphery of a basin.

Another object is to completely mix the liquid in the basin or lagoon to minimize sludge deposits in areas of low turbulent influences.

Another object is to provide intimate contact between nutrient, microbial masses, and dissolved oxygen throughout a basin.

Another object is to minimize channeling or short circuiting through a lagoon or basin through the constant or cyclical motion of the aeration unit or units.

Other objects and advantages of our invention will appear from time to time in the following specification and claims.

The invention is illustrated more or less diagrammatically in the following drawings wherein:

FIGURE 4 is a plan view showing apparatus for practicing the method of our invention in a square lagoon;

FIGURE 5 is a plan view showing apparatus for practicing our invention in a rectangular lagoon;

FIGURE 6 is a plan view showing another form of apparatus for practicing the method of our invention;

FIGURE 7 is a plan view showing apparatus for utilizing two aeration units in the practice of the method of our invention;

FIGURE 8 is a plan view showing apparatus for moving a number of aeration units across a lagoon with each unit moving in a reciprocal path;

FIGURE 9 is a plan view showing apparatus for guiding aeration units across a lagoon while controlling lateral movement thereof; and FIGURE 10 is a plan view showing the use of a moving aeration unit in conjunction with a number of fixed aeration units in a lagoon to eliminate channeling and sludge deposits.

Figure 1:
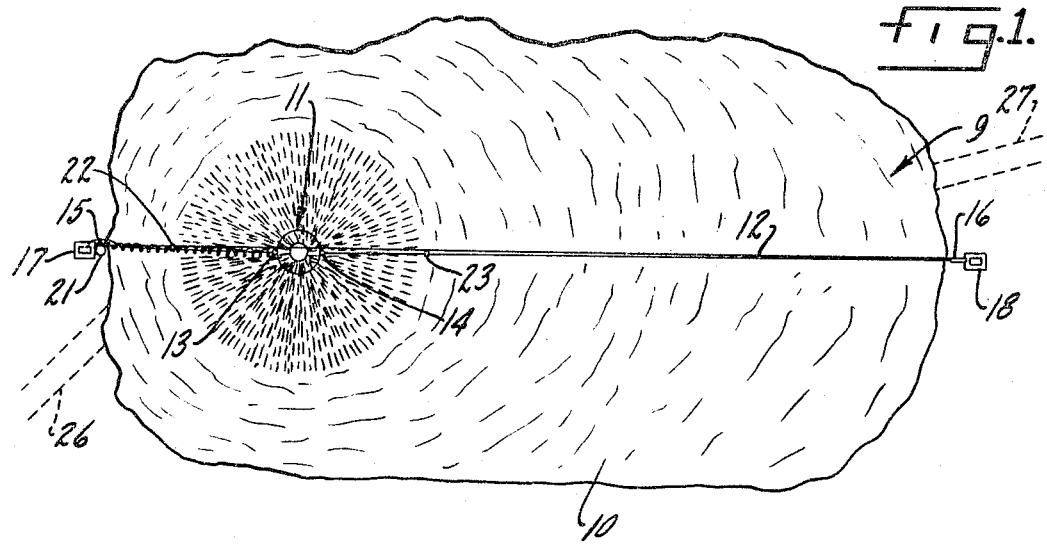
FIGURE 1 is a plan view showing apparatus for utilizing the method of our invention in a lagoon.

The method of our invention is particularly suitable for use in artificially mixing, influencing and aerating large bodies of liquid, and particularly bodies of water such as stabilization ponds, activated sludge basins, lagoons, streams and reservoirs. Although frequently in the specification the body of liquid is referred to by only one of the foregoing terms, it should be understood that when this occurs some or all of the aforementioned terms may also be applicable. A body of water of this type is indicated by the numeral 9 in FIGURE 1. Although it should be understood that the body of water may be of almost any size and shape, for purposes of illustration the surface 10 of the body 9 is shown as generally rectangular having an approximate major dimension on the order of 600 feet and an approximate minor dimension on the order of 200 feet. It should also be understood that although the walls of pond are illustrated as being of earthen construction, they could also be constructed of any suitable material, a few of which might be concrete, asphalt or plastic. Floatable aeration units of the type intended for use with our method, and generally designated in the drawings by the numeral 11, are effective to circulate, aerate and influence the liquid in a pond up to a distance of approximately 30 to 200 feet from each of the aeration units depending on the size or horsepower of the particular unit being employed. In order to aerate a body of water of the size and shape mentioned above it would be necessary to provide and install a large number of floatable aeration units if the units were to be fixed in position across the length and width of the pond. The provision of a sufficient number of fixed floatable aeration units to adequately cover the area of such a pond is expensive and wasteful since it is generally not necessary to provide such a large number of units to obtain proper aeration and mixing of the liquid in the pond.

Following the teachings of our method, a body of liquid of the size and shape of pond 9 may be aerated, mixed and influenced through the use of a single floatable aeration unit 11. This is accomplished by moving the aeration unit across the surface 10 of the pond following a predetermined pattern and at a predetermined rate of movement. An apparatus for performing this method is shown more or less diagrammatically in FIGURES 1 and 2 in which a floatable aeration unit is moved reciprocally across the length of the pond by means of a cable 12. The ends of the cable are connected to opposite sides of the aeration unit at 13 and 14 and the cable is looped around pulleys 15 and 16 which are located at opposite ends of the pond. The pulleys are mounted respectively on supports 17 and 18 which may be located on the banks of the opposite sides of the pond. One of the pulleys may be arranged to be driven and the other to act as an idler. In this arrangement, pulley 15 is rotated by a motor 21 to move the cable 12 across the pond. Stop members 22 and 23 may be attached to the cable 12 on opposite sides of the aeration unit for the purpose of engaging suitable switches (not shown) adjacent the pulleys 15 and 16 in order to reverse rotation of the motor 21 and thus provide for reciprocating movement of the cable and aeration unit.

Figure 2:
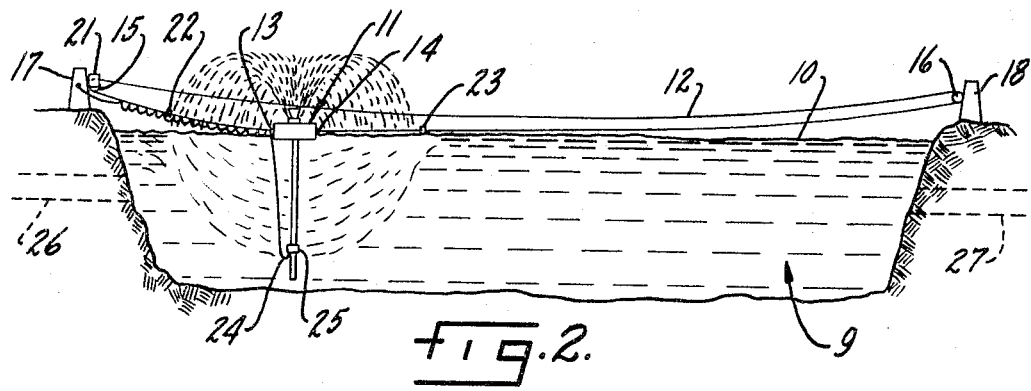
FIGURE 2 is a side elevational view of the lagoon and apparatus of FIGURE 1.

The areation unit 11 may be operated by an electric motor 25 and power for this motor may be supplied by a power wire 24 leading from shore. In the apparatus of FIGURES 1 and 2 the power wire runs from the structure 17 which supports the pulley 15 and motor 21. The power wire may be spirally looped on the cable 23 for support and to allow for extension and contraction or may be maintained under tension by a device such as a common rewind (not shown) which may be located in the structure 17. The purpose of spirally looping or maintaining tension on the power wire is to prevent its entanglement with the aeration unit during reciprocal movement thereof. The power wire 24 is waterproofed so that it may run beneath the surface of the water. This permits the motor 25 which operates the aeration unit to be located beneath the unit.

Inlet 26 carries the influent to the basin for treatment. Outlet 27 carries the effluent away from the basin. While the inlet and outlet are depicted in these drawings as underground conduits, it should be understood that they could be of other conventional constructions such as an above ground stream, flume, trough, etc. Influent and effluent conduits are not illustrated in all of the drawings of this application, but may be provided.

Figure 3:
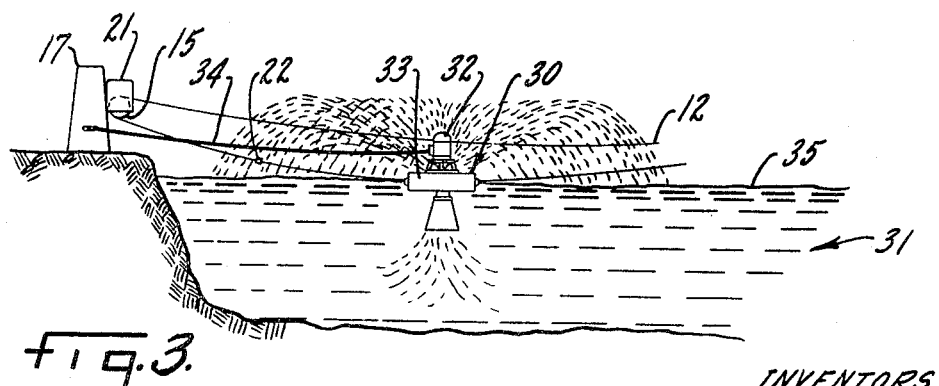
FIGURE 3 is a partial side elevational view of another form of apparatus for practicing the method of our invention.

An adaptation of the reciprocating apparatus of FIGURES 1 and 2 to an aeration unit 30 in which the operating motor is located on top of the unit and above the surface of the liquid is shown in FIGURE 3. The motor 32 for operating this unit is mounted on top of a float 33 and a power cord 34 is held above the surface 35 of the pond throughout reciprocating movement of the unit across the surface of the pond by a constant tension rewind mechanism (not shown). In all other features, the apparatus for moving this type of aeration unit may be the same as that shown and described in FIGURES 1 and 2. In large basins, the power cord 34 may be spirally wound around the supporting cable 12 in the same manner as shown in FIGURE 2 and the rewind mechanism may be omitted in order to avoid the use of a rewind mechanism having excessive tension.

An apparatus for applying the method of our invention to a pond, lagoon or basin 40 having a generally square surface 41 is shown diagrammatically in FIGURE 4. In this apparatus, one aeration unit, which may be either a unit 11 or a unit 30, is moved in a generally square path upon the surface of the pond. Movement in a square path is accomplished by connecting the aeration unit to a continuous cable 42 and a rotatable center member 43. The cable 42 is looped around pulleys 44, 45, 46 and 47. As shown in the drawings, the pulleys may be mounted respectively on tops of supports 48, 49, 50 and 51 arranged in a square configuration on the banks of the pond 40 with the axes of the pulleys extending vertically and with the pulleys positioned above the surface 41 of the pond 40. The aeration unit 11 may be connected to the looped cable 42 by means of a cable 52 and to the rotatable center 43 by means of a cable 53. The aeration unit 11 may be equipped with a pair of constant tension rewind devices (not shown) to maintain uniform and constant tension on the cables 52 and 53 to guide the unit in a squared path as the cable 42 moves in its square path around the pulleys. The cable may be moved in its path around the pulleys by a motor 54 mounted to drive one of the pulleys. In this instance, the motor drives pulley 47. The power supply for the aeration unit may be provided by means of a power wire 55 which leads through the rotatable center member 43 and may be carried by the cable 53. The power wire may also be provided with a constant tension rewind (not shown) to prevent it from being entangled during movement of the aeration unit.

In FIGURE 5, apparatus is shown for the adaptation of our method to a pond 60 of generally rectangular shape. In this example two aeration units 30 are moved in rectangular paths across the surface 61 of the pond by means of an overhead trolley type conveyor system 62. This trolley conveyor system may be supported above the surface of the pond in any conventional manner but the actual support thereof is not shown. A motor 63 supplied by under ground power wire 64 moves the conveyor. The aeration units may receive their power from the overhead trolley system in any conventional manner but this also is not shown in the drawings.

Another apparatus for practicing the method of our invention on a pond 70 of irregular shape is shown diagrammatically in FIGURE 6. Therein, an aeration unit 30 is connected to a rotatable center support 71 and to a continuous cable 72 which extends around three pulleys 73, 74 and 75 arranged in a triangular pattern around and above the pond. One of the pulleys may be driven to move the cable. The aeration unit is connected to the cable 72 at spaced points 76 and 77 by fixed length cables 78 and 79 and is connected to its rotatable center support by a constant tension cable 80. With this arrangement the movement of the cable 72 pulls the aeration unit 30 around the pond with the center support 71 being its center of movement. A power wire 81 leads from the aeration unit to the center support 71 and underground to a source of power. As with the other power wires a constant tension rewind device is utilized to keep this cord from becoming entangled.

The use of two aeration units moving in different paths to service a pond 90 of irregular shape is shown diagrammatically in FIGURE 7. In this illustration, one aeration unit 11 is moved in a reciprocal path along the length of a portion of the pond by an apparatus of the type shown in FIGURE 1. The other portion of the pond is serviced by an aeration unit 11 which is moved in a circular path about a rotating center member 91. The aeration unit is connected to this rotatable center member by a boom 92. A power wire 93 runs from the center member to the aeration unit.

An apparatus for utilizing a single power operated winch 100 to move a number of aeration units 30 in parallel reciprocating paths is shown diagrammatically in FIGURE 8. In this apparatus, the aeration units are arranged to treat a portion of a stabilization pond 101 which has a generally rectangular surface area. Only a portion of a stabilization pond is treated where, as in this instance, it is desirable to use the remainder of the body of liquid as a quiescent zone or settling basin. In such situations it is generally the practice to place the aeration units near the influent inlet which is indicated at 102 in the illustrations. The effluent discharges through outlet 103 at the opposite end of the body of liquid. The winch 100 is made up of a drum 104 around which is wound the cable 105 which in turn is connected to the aeration units. The drum may be driven by a motor 106. The cable 105 is guided around a plurality of pulleys 107 which are mounted in spaced relationship on opposite sides of the pond and are elevated above the surface of the pond. The cable is threaded around the pulleys so as to provide for the movement of the aeration units laterally across the pond. Suitable stops (not shown) may be provided upon the cable on opposite sides of at least one of the aeration units to engage switches (not shown) so as to reverse the direction or rotation of the motor and cable to provide for the reciprocal movement of the units. Power for the aeration units 30 may be supplied by a power line 115 located on one side of the pond with lead lines 116 running to poles 117 located on the shore adjacent the individual aeration units. Power wires 118 leading from the poles to each unit may be looped around the cables 105 for support or may be held by rewind devices as previously described. These power wires may be held above the water or may be waterproofed and allowed to extend underneath the water to the units.

FIGURE 9 illustrates the apparatus of FIGURE 8 with the addition of support arms 120 attached to the aeration units 30 for the purpose of engaging guiding cables 121 that may be mounted above the surface of the pond and anchored to supports 122. The support arms and cables are intended to guide the aeration units in their reciprocal movement across the ponds while limiting and controlling the lateral movement of the units which could be caused by wind, current, wave action caused by wind or the reaction of the units due to the movement of liquid caused by the operation of the aeration unit.

The adaptation of a movable aeration unit 30 to eliminate channeling and sludge deposits in a lagoon 130 containing a number of fixed aeration units 131 shown in FIGURE 10. In bodies of liquid which are treated by fixed aeration units, it frequently happens that some of the untreated liquid, during passage from an inlet 132 to an outlet 133, moves in a channel 134 which skirts the area of influence of most of the fixed aeration units and passes through the lagoon without adequate treatment. The movement of liquid in this channel may also bring about a build up of sludge deposits 135 adjacent the channel. These sludge deposits remain untreated due to being located beyond the areas of influence of the fixed aeration units. These problems can be solved by locating a movable aeration unit 30 so that its path of movement intersects the channel of the untreated liquid. As shown in FIGURE 10, a single movable aeration unit is used, but this should not be understood as precluding the use of a number of movable aeration units if required. The movable aeration unit is moved reciprocally across the pond by means of a cable 136 having opposite ends connected to the areation unit at 137 and 138. The cable is looped around pulley 139 located at one end of the lagoon and around winch 140 located at the opposite end of the lagoon. The winch 140 includes a drum 141 which is driven by a motor 142. Suitable stops (not shown) may be provided on the cable to engage switches (not shown) so as to reverse the direction of rotation of the motor and cable to provide for reciprocal movement of the aeration unit. Power for the aeration unit 30 may be provided by a power cable 143 which is spirally wound around the supporting cable 136 and runs from the shore to the aeration unit. The power supply for the fixed aeration units may be run either under or above the liquid in any conventional manner but the details thereof are not shown.

The use, operation and function of our invention are as follows:

Our invention is concerned with both a method and apparatus for effectively aerating, mixing and influencing large bodies of liquid through the use of a relatively small number of floating aeration units which are moved across the surface of a body of liquid in enclosed paths and at selected rates of movement. By influence, we mean to provide intimate contact between the nutrient, microbial masses and dissolved oxygen in the liquid to be treated. Our invention is particularly adaptable to the aeration of stabilization basins, ponds and lagoons used in the treatment of waste materials at sewage treatment and industrial plants in which the influent is introduced through a conduit at one end of the basin and the effluent is discharged through a conduit at the opposite end.

A typical floatable aeration unit may effectively mix, influence and aerate the liquid in a pond, basin or lagoon within a radius of up to a maximum of 200 feet or more from the unit. In large ponds, lagoons or basins it has been necessary to provide a large number of spaced floating aeration units in order to treat all portions of the body of liquid. The installation and operation of a large number of units is expensive due both to the initial cost of the units and the cost of operating them. Also, the use of fixed aeration units may result in channeling or short circuiting of the influent through the body of liquid causing inadequate treatment.

By moving one or more floating aeration units across the surface of a pond or other body of liquid in a predetermined path and at a selected rate of movement, aeration of the entire body of liquid can be obtained with a minimum of units and channeling of the influent can be reduced or eliminated. Whereas we have said that the unit or units are moved in accordance with a predetermined pattern, it should be understood that this may be a rather loose pattern. For example, the connecting cables to the units may have a certain amount of slack in them such that wind or current could blow the unit to one side or another of what would normally be considered as the path. But within this frame and context it should be understood that the term "predetermined pattern" means the pattern is established, although other factors may bear on it. The rate of movement of the aeration units across the surface of the liquid will be determined by the surface area and depth of the body of liquid as well as by the capacity of each aeration unit and the amount of circulation and quantity of oxygen required to treat the particular liquid. A rate of movement of an aeration unit across the surface of a body of liquid within the range of ½ to 5 feet per minute has been found to be sufficient, however, our invention should not be limited to a rate of movement within these limits since the exact rate of movement must be determined by the physical characteristics of the particular body of liquid being treated.

Satisfactory treatment of a body of liquid can also be accomplished by intermittent movement and operation of one or more aeration units on the surface of the body of liquid. In the intermittent movement method, each aeration unit is moved from position to position across the surface of the pond and is operated for a predetermined period of time in each position. The positions may be spaced apart a distance approximately equal to twice the effective radius of circulation of the particular aeration unit used. In this method, an aeration unit is operated in each position a sufficient length of time to mix, influence and aerate the liquid surrounding the unit at that location. At the end of the time period the unit is moved to the next position. This cycle of movement and operation may be repeated continuously.

The pattern of movement and the number of aeration units used in the practice of our invention may be varied depending upon the size and shape of the portion of the body of liquid to be mixed, aerated and influenced. Any pattern and number of units that will provide the required mixing, aerating and influencing will be satisfactory. Depending on the size and shape of the body of liquid, a single aeration unit moving in a reciprocal path across the surface of the body of liquid, as shown in FIGURE 1, may be sufficient to provide the required treatment. If all of a body of liquid having a square surface configuration is to be treated, it may be advantageous to move the aeration unit in a square path using apparatus of the type depicted in FIGURE 4. A rectangular basin of liquid may best be treated by one or more aeration units moving in rectangular paths as shown in FIGURE 5. Bodies of liquid having surfaces of irregular shape might lend themselves to coverage by a unit moving in other geometric patterns such as the generally triangular path which is followed by the aeration unit shown in FIGURE 6. Some irregular shaped bodies of liquid such as those shown in FIGURE 7 may require the use of more than one aeration unit.

The apparatus of FIGURES 8 and 9 is shown as adapted to treat a portion of a pond, lagoon or basin. Treatment of only a portion of a body of liquid may be performed where it is desired to utilize the remainer of the body of liquid as a quiescent zone or settling basin. Of course, the apparatus shown in these figures could also be used to treat an entire body of liquid. The apparatus of FIGURE 9 is especially adaptable for use in situations where it is difficult to maintain the aeration units in their prescribed paths due to such factors as wind, current and the reaction of the aeration unit itself.

Use of our method and apparatus permits the mixing, influencing and aeration of bodies of liquid in a more economical and efficient manner than is presently available. As can be seen from the foregoing description, our invention resides in moving one or more aeration units across the surface of the body of liquid in a predetermined path or paths so as to permit the mixing, influencing and aeration of all or part of a body of liquid with a relatively small number of units. Although we have used the terms aerate, mix, circulate and influence to describe the action of the aeration units on the liquid, the function of these units is to reduce the biochemical oxygen demand (B.O.D.) of the liquid and this action is generally described simply as aerating. In the claims appended hereto, the terms aerating and aeration should be understood to refer to aeration, mixing, circulation and influencing of the liquid to reduce the B.O.D.

One or more movable aeration units can be utilized to decrease or eliminate channeling or short-circuiting of influent through a pond or basin in which one or more fixed aeration units are installed. Channeling occurs when some of the influent moves through the pond or basin between or around the fixed units without being aerated. By arranging the path of a movable unit so that it intersects the path of movement of the untreated influent, the channeling or short circuiting can be eliminated and complete aeration of the influent can be accomplished without extensive rearrangement of the fixed aeration units. Sludge deposits in areas of low turbulence in a body of liquid being treated by one or more fixed aeration units can also be eliminated by installing one or more movable aeration units arranged to be moved over these areas of low turbulence. Thus, problems of channeling and sludge deposits in an installation of fixed aeration units can be corrected by use of one or more movable aeration units as shown in FIGURE 10.

Movable aeration units of the type described in this application may also be advantageously used to maintain a pond or basin free of ice during cold weather. Moving aeration units will be more effective than fixed units in breaking up existing ice and retarding formation of new ice. In cold climates some lagoons are allowed to become anaerobic during the winter months because microbial activity is reduced at low temperatures. The change over to aerobic conditions in this type of lagoon in the early spring can be accomplished more readily and the noxious odors which generally accompany this change over can be substantially reduced by the use of a moving aeration unit. The use of a moving aeration unit also brings about quicker breakup of ice on the lagoon and adds oxygen to all areas of the lagoon at a more rapid rate than is obtained by fixed aeration units.

We claim:

1. An apparatus for aerating a body of liquid including:
   a power operated floatable aerating unit capable of drawing liquid from beneath the surface of said body of liquid and discharging it above said surface,
   a source of power capable of operating said aerating unit to draw liquid from below the surface of the body of liquid and to discharge it above the surface,
   supports positioned on opposite sides of said body of liquid,
   a pulley attached to each support,
   a cable looped around said pulleys and supported thereone with the ends of the cable connected to said aerating unit,
   means to rotate one of said pulleys,
   means to cyclically change the direction of rotation of said pulley to move said cable and aerating unit reciprocally across the surface of said body of liquid, and
   a flexible conduit connecting said source of power and said aerating unit.

2. The structure of claim 1 further characterized in that said conduit is in the form of a flexible wire looped around and supported by said cable.

3. The structure of claim 1 further characterized in that said conduit is in the form of a flexible wire and means are provided to maintain a generally uniform tension on said wire as the aerating unit is moved reciprocally across the body of liquid.

4. An apparatus for aerating a body of liquid including:
   a plurality of power operated floatable aerating units capable of drawing liquid from beneath the surface of said body of liquid and discharging it above said surface,
   a source of power capable of operating said aerating units to move liquid from beneath the surface of the body of liquid and to discharge it above the surface,
   a pair of supports located on opposite sides of said body of each aerating unit,
   a pulley attached to each support,
   cables connecting said aerating units with each of said cables connecting two aerating units and being looped around and supported on two pulleys on the same side of said body of liquid,
   means to move said cables cyclically in opposite directions to move said aerating units back and forth across the width of said body of liquid with each aerating unit moving oppositely to an adjoining aerating unit, and
   power wires extending from said source of power to said aeration units.

5. The structure of claim 4 further characterized in that at least one guide wire extends across said body of liquid in a direction parallel to the path of movement of each aerating unit and means connect said wire and said aerating unit to guide the unit in its path of travel across said body of liquid.

6. A method of minimizing sludge deposits in areas of low turbulent influences in a body of liquid being aerated by a plurality of fixed aerating units located in spaced relationship to one another across the surface of said body of liquid and in which an area of said body of liquid is not influenced by the aeration effect of said fixed units including the steps of:
   floating in said body of liquid at least one power operated aerating unit capable of being moved reciprocally across the surface of said body of liquid,
   operating said aerating unit to draw liquid from beneath the surface of said body of liquid and to discharge it above the surface, and
   moving said aerating unit reciprocally along a path across said area in which the aeration effect of said fixed units is not effective.

7. A method of minimizing the flow of untreated liquid through a body of liquid being aerated by a plurality of fixed aerating units in which said fixed units are positioned on the surface of said body of liquid in spaced relationship to one another between the inlet and the outlet thereto and in which the areas of influence of said fixed units do not include the entire body of liquid thereby leaving a continuous path for untreated liquid to flow between said inlet and outlet without passing through an area of influence of at least one of said units including the steps of:
   floating in said body of liquid at least one power operated aerating unit capable of being moved in a reciprocal path across the surface of said body of liquid,
   operating said aerating unit to draw liquid from beneath the surface of said body of liquid and to discharge it above the surface; and moving said aerating unit along a reciprocal path which intersects the continuous path of said untreated liquid moving between said inlet and said outlet and does not collide with any of said fixed aerating units.

References Cited by the Examiner

UNITED STATES PATENTS

| | | | |
|---|---|---|---|
| 302,326 | 7/1884 | D'Heureuse | 261—120 |
| 1,982,715 | 12/1934 | Whiteside | 259—102 |
| 2,271,446 | 1/1942 | Unger | 210—63 |
| 2,825,541 | 3/1958 | Moll et al. | 210—220 X |
| 2,827,268 | 3/1958 | Staaf | 210—242 X |
| 3,208,734 | 9/1965 | Wood et al. | 259—111 |
| 3,218,042 | 11/1965 | Ciabattari et al. | 210—15 |

MORRIS O. WOLK, *Primary Examiner.*

MICHAEL E. ROGERS, *Examiner.*